March 22, 1960  A. G. GETZ  2,929,310
AUTOMOBILE HEATER AND VENTILATOR CONTROL MEANS
Filed Feb. 21, 1958  5 Sheets-Sheet 1

INVENTOR.
Arnstead G. Getz,
BY Brown, Jackson,
Boettcher & Dienner
Attys.

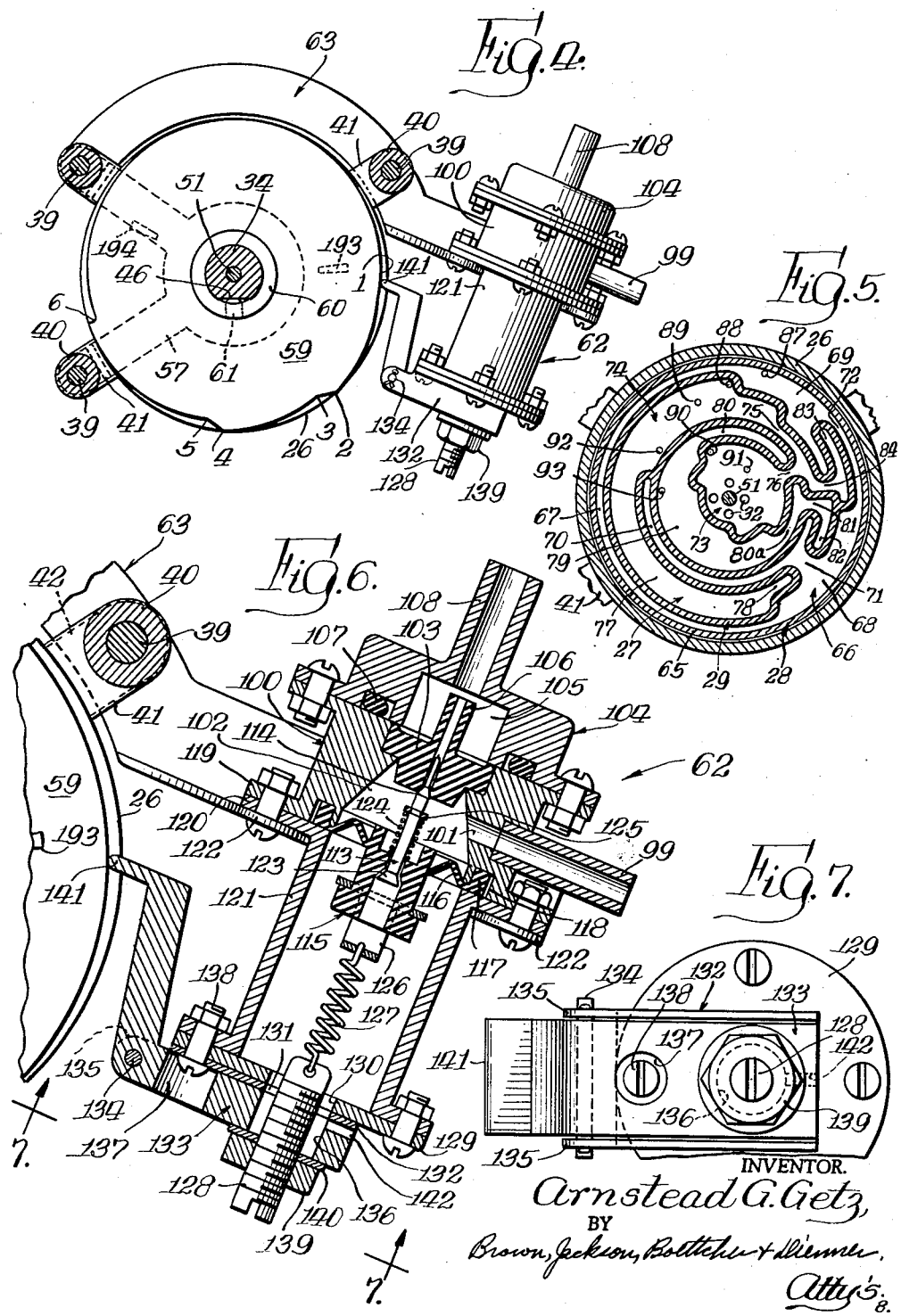

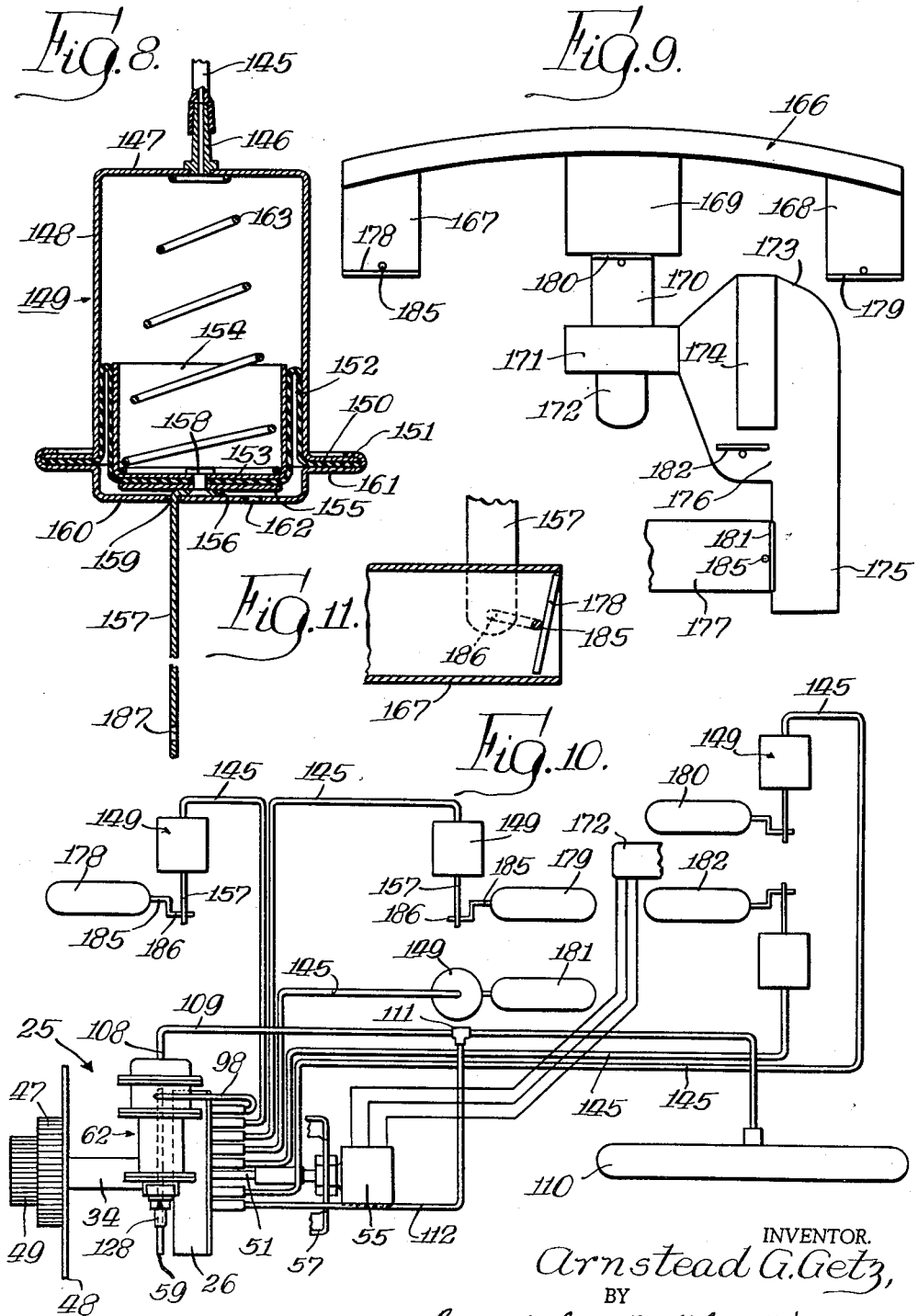

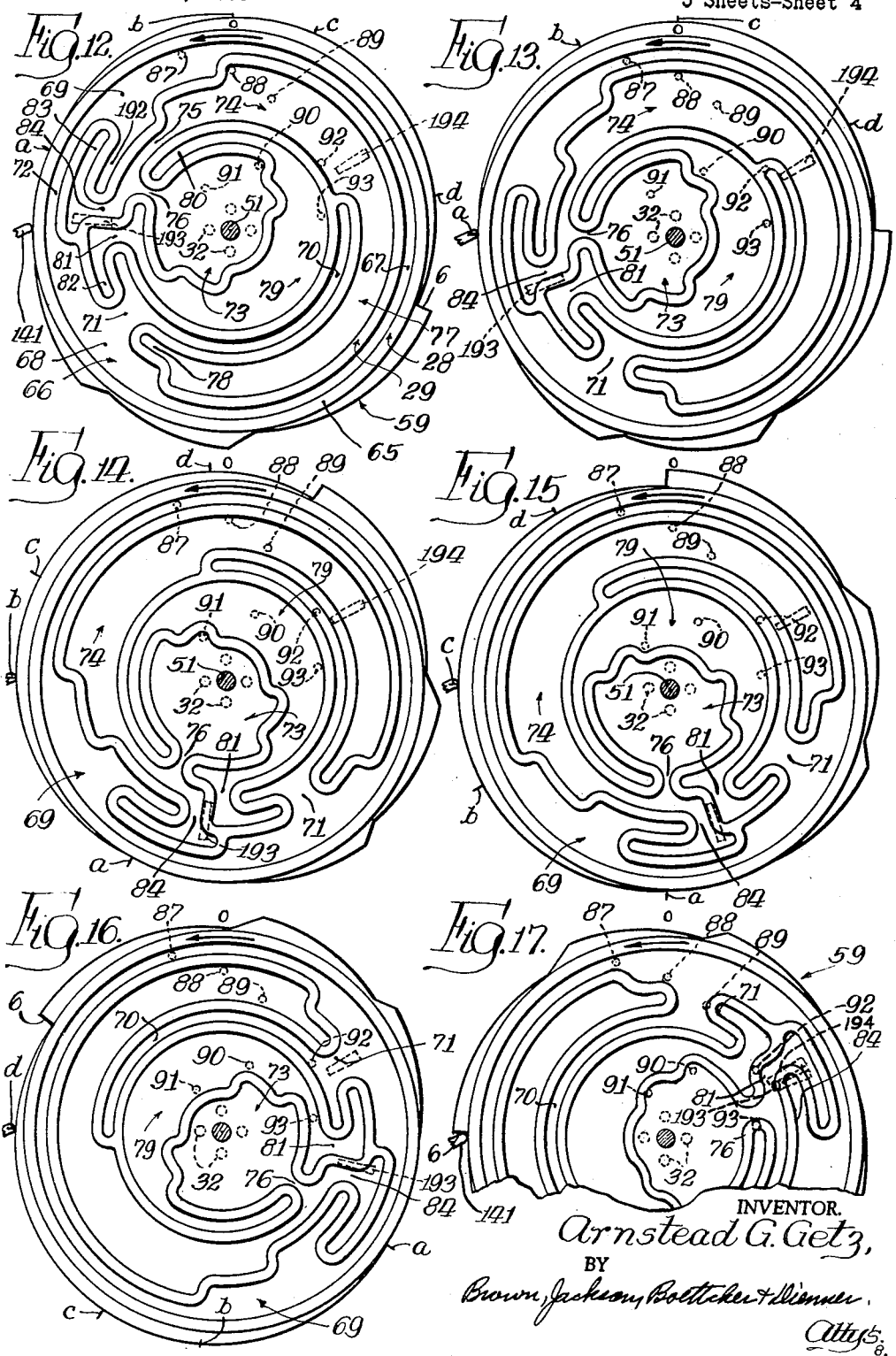

March 22, 1960 A. G. GETZ 2,929,310
AUTOMOBILE HEATER AND VENTILATOR CONTROL MEANS
Filed Feb. 21, 1958 5 Sheets-Sheet 5

INVENTOR.
Arnstead G. Getz,
BY
Brown, Jackson, Boettcher & Dienner
Atty's.

United States Patent Office 2,929,310
Patented Mar. 22, 1960

2,929,310

AUTOMOBILE HEATER AND VENTILATOR CONTROL MEANS

Arnstead G. Getz, Lakewood, Ohio, assignor to The Bishop and Babcock Manufacturing Company, Cleveland, Ohio, a corporation of Ohio Application February 21, 1958, Serial No. 716,694

11 Claims. (Cl. 98—2)

This invention relates to means for controlling the heating and ventilating means for automobiles.

Automobiles are presently provided with a heater in conjunction with an air inlet manifold and associated ducts and dampers for controlling the heat output of the heater and for directing heated air against the windshield, in cold weather, and for admitting outside air to the interior of the automobile, at either one or both sides thereof, for ventilation, in warm or hot weather. Under present practice, it is customary to provide a plurality of adjusting means for the various dampers, with a corresponding increase in the number of devices mounted on or adjacent the instrument panel. That frequently leads to confusion and necessitates the manipulation of a plurality of devices to obtain the desired adjustments in respect to either heating or ventilating, while adding appreciably to the cost of the installation, both of which are objectionable for obvious reasons.

My invention is directed to control means which avoids the above noted objections to the presently used controls. To that end I provide a single control means whereby the desired adjustments for either heating or ventilating may be obtained with expedition and facility. In the control means of my invention a single control member effects the desired adjustments of the dampers, for heating, by turning thereof in one direction to predetermined extent, and turning of such member in the opposite direction to predetermined extent effects the desired adjustments of the dampers, for ventilating. The control means of my invention is compact, occupies comparatively little space and may readily be installed as a unit, which is conducive to low cost, eliminates necessity for a plurality of adjusting devices and resultant possible confusion, and provides convenient means of neat appearance for adjusting the dampers to any desired extent for varying the heating effect or the ventilating effect as desired. Further objects and advantages of my invention will appear from the detail description.

In the drawings:

Figure 1 is a plan view of the control means assembly of my invention mounted on the instrument panel, the latter being shown fragmentarily;

Figure 2 is a side view of the control means assembly of Figure 1, the instrument panel and the backing plate therefor being shown fragmentarily and in section;

Figure 3 is a sectional view taken substantially on line 3—3 of Figure 1, certain parts being shown in elevation and certain other parts being broken away;

Figure 4 is a sectional view taken substantially on line 4—4 of Figure 2;

Figure 5 is a sectional view taken substantially on line 5—5 of Figure 2;

Figure 6 is an axial sectional view, on an enlarged scale, of the air and suction control valve and cam follower, taken substantially on line 6—6 of Figure 2, certain parts being shown in elevation and the mounting bracket and the selector head housing and adjusting cam being shown fragmentarily;

Figure 7 is an underneath view, partly broken away, of the valve and cam follower of Figure 6, taken substantially on line 7—7 of Figure 6

Figure 8 is an axial section view of one of the damper motors;

Figure 9 is a diagrammatic view of the air inlet manifold and heater and associated air ducts and dampers of an automobile heating and ventilating system to which the control means of my invention is applied;

Figure 10 is a diagrammatic view of the control means of my invention connected to a source of suction and to a blower motor and control dampers of the system of Figure 9, the manifold and ducts and blower of the latter figure being omitted for clearness of illustration;

Figure 11 is a fragmentary sectional view, on an enlarged scale, of one of the air ducts of the system of Figure 9, showing a damper therein and its connection to the piston rod of the associated damper operating motor;

Figure 12 is a front view, on an enlarged scale, of the selector control head and the adjusting cam, in rear of the head, with the latter removed from its housing and shown in its normal position, the inlet ports of the base plate for the control head being shown as superimposed on the latter in dotted lines;

Figure 18:
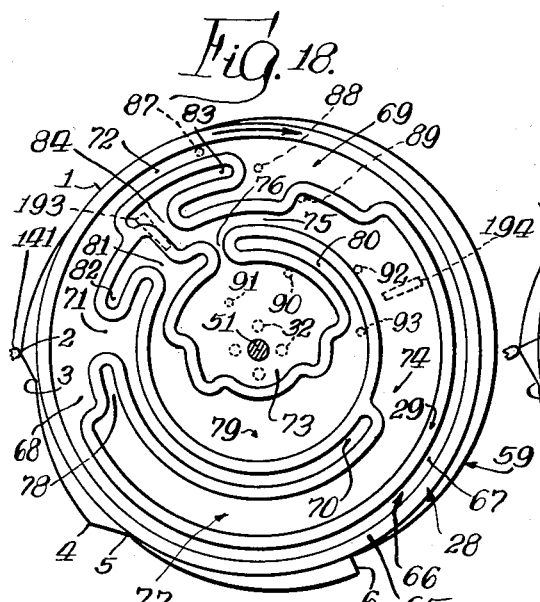
Figure 19:
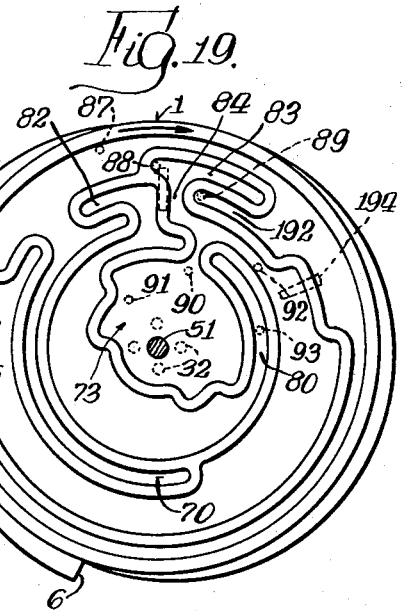
Figure 20:
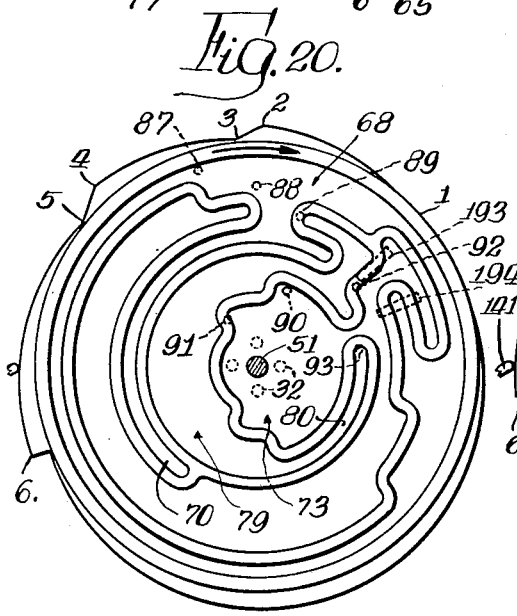
Figure 21:
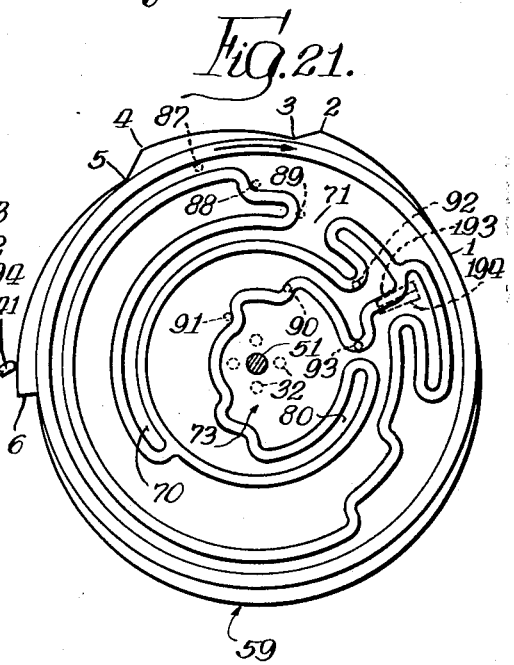

Figures 13 to 17, inclusive, are views similar to Figure 12 but showing successive positions of the selector control head relative to the associated control parts when the head is turned counter-clockwise, as viewed in those figures, for operating the blower, bypass and defroster dampers for cold weather or winter operation of the heating and ventilating system; and Figures 18 to 21, inclusive, are views similar to Figure 12 but showing successive positions of the selector control head when turned clockwise, as viewed in those figures, for operating the ventilation dampers.

The control means of my invention includes an adjusting valve assembly 25 comprising a cylindrical cup shaped cover 26 closed at its forward end by a flanged circular base plate 27 fitting tightly in the rabbeted forward end of cover 26. The cover 26 and base plate 27 provide a housing within which is disposed a selector control head 28 of circular shape and of a diameter slightly less than the interior diameter of cover 26. The head 28 is provided at its forward or front face with a rib 29, to be described more fully later, which seats upon the inner face of base plate 27 in air tight sealing contact therewith, the rib 29 and the inner face of plate 27 being accurately ground or lapped for that purpose. The base plate 27 is provided with a short central neck 30 which receives a filter disc 31 formed of fiber or other suitable material which permits ready passage of air therethrough, the disc 31 overlying ports 32 opening through plate 27 at the central area thereof. The cover 26 is provided with a central rearwardly extending neck 33, which is comparatively short, and which receives an elongated neck 34 extending from head 28 rearwardly through neck 33 and through aligned openings in instrument panel 35 and in a sheet metal backing plate 36 at the front of panel 35, which plate 36 may constitute a portion of the fire wall of the automobile. The plate 36 is provided with suitably disposed forwardly extending sockets 37 pressed therefrom and of substantially frusto-conical shape to receive the frusto-conical heads 38 of mounting bolts 39 passing through spacing sleeves 40 seating at their rearward ends on the sockets 37 and at their forward ends on ears 41 projecting from cover 26 at the front thereof. The ears 41 seat on ears 42 projecting from the base plate 27, ears 41 and 42 having aligned openings through which the bolts 39 extend, there being securing nuts threaded on the forward ends of the bolts 39 and seating on spring washers 44 seating on the forward faces of ears 42 of plate 27.

The housing comprising the cover 26 and plate 27 is thus mounted on the backing plate 36 in spaced relation thereto, the mounting bolts and nuts, in conjunction with the spacing sleeves 40, also providing means whereby the cover 26 and the base plate 27 are secured tightly together in properly assembled relation so as to exclude entry of air into the housing except through the ports 32. The rib 29 of head 28 is pressed against the inner face of plate 27, so as to provide an air tight seal therewith, by a compression spring 45 disposed about neck 34 and confined between cover 26 and the rearward face of head 28. The portion of neck 34 extending rearward beyond neck 33 of cover 26 is slabbed off to provide a flat 46 and the rearward end portion of neck 34 receives hub 47 of a dial 48 secured on neck 34 by a set screw 48a threaded through hub 47 from one side thereof and engaging the flat 46. The hub 47 is recessed from its rearward face to receive a flanged knob 49 secured by a set screw 50 to the rearward end of a switch rod 51 rotatably mounted through neck 34 and extending through and forwardly beyond base plate 27. A coupling sleeve 52, secured upon the forward end of rod 51, receives an operating stem 53, to which it is secured by a set screw 54, of an electric switch 55 of known type. The switch 55 is provided with a threaded neck 56 secured through the bight portion of a U-shaped bracket 57 mounted on the housing comprising cover 26 and plate 27 by two of the mounting bolts 39. Neck 56 of switch 55 receives clamp nuts 58 threaded thereon at opposite sides of the bight portion of bracket 57 effective for securing switch 55 tightly in position. A cam member 59 fits about neck 34 of head 28 and seats on the rearward end of neck 33 of cover 26. The cam member 59 is provided with a rearwardly extending neck 60 fitting snugly about neck 34 and secured thereto by set screw 61 engaging flat 46. An air and suction control valve 62, to be described more fully later, is mounted adjacent one side of the housing comprising cover 26 and plate 27, by means of a bracket 63 secured to the housing by certain of the bolts 39, as shown more clearly in Figures 4 and 6. As will be understood from what has been said, the control assembly, including the switch 55 and the air and suction control valve 62, is mounted by means of the bolts 39 and associated parts on the plate 36 extending forwardly therefrom, certain of the bolts providing means for mounting the brackets 57 and 63, and the dial 48 and the switch operating knob 49 are disposed in proximity to the rearward face of the instrument panel 35 in position to be readily accessible to the driver of the automobile.

Referring to Figure 5, the head 28 is provided, at its forward face, with a peripheral flange or rim 65 additional to the rib 29. The latter is of generally labyrinthine shape and provides with the rim 28 an outer controlled suction area or passage 66 having a first outer narrow portion 67 opening at one end into a relatively wide portion 68 and at its other end into a second wider portion 69, an inner narrow arm or portion 70 closed at one end and opening at its other end through neck 71 into the wider portion 68, and a relatively short narrow portion or arm 72 opening at its ends into the wider portions 68 and 69 arm 70 being substantially shorter than arm 67 and arm 72 being substantially shorter than arm 70. The rib 29 also defines an atmospheric air area or passage having a central or inner portion 73 into which the air ports 32 open and an outer atmospheric area portion 74 opening into the inner portion 73 through a narrow portion 75 and a neck 76. The outer atmospheric air passage portion 74 has a portion 77 thereof, which is of substantial extent, of reduced width terminating in a relatively narrow extension 78 closed at its outer end. The rib 29 also provides an intermediate direct suction area or passage 79 from one end of which extends an arm or portion 80 of substantially reduced width one end of which defines one side of neck 76, passage 79 being provided at its other end with an extension 80a of materially reduced width opening through a neck 81 into a reversely directed arm or finger 82 of approximately the same width as extension 80a, it being noted that the atmospheric air passage 74 is also provided with an arm 83 of substantially reduced width opening through a neck 84 into neck 76. As will be understood from what has been said, the rib 29 and rim 65 of head 28 define a controlled suction passage, an atmospheric air passage having an inner central portion and an outer portion, and a direct suction passage, certain of such passages having portions of reduced width in the nature of extensions or arms thereof extending into but not communicating with the other passages, as above described in detail, and the passages of head 28 are closed thereby at one side and are closed at their opposite or forward side by plate 27, except as to the air inlet ports 32 and certain other parts, to be referred to presently, opening through plates 27.

The plate 27 is provided, in addition to the air inlet ports 32, with seven ports 87, 88, 89, 90, 91, 92 and 93 which, in the normal position of head 28, shown in Figure 5, underlies certain passages of the head as there shown. For reasons which will appear more clearly presently, the port 87 is designated the controlled suction port, the port 88 is designated the left damper port, port 89 is designated the right damper port, port 90 is designated the blower damper port, port 91 is designated the defroster damper port, port 92 is designated the bypass damper port and port 93 is designated the direct suction port. Each of the ports 87 to 93, inclusive, opens into a nipple 94 formed integrally with and projecting forwardly from the base plate 27.

The nipple 94 of the controlled suction port 87 is connected by a suitable conduit 98, conveniently a flexible rubber tube, to a nipple 99 secured in body section 100 of the air and suction control valve 62 and opening, through a short duct 101 into chamber 102 of body section 100. The body section 100 is recessed from its upper end for reception of a flanged valve seat member 103 formed of rubber or other suitable material, the flange of which is clamped between body section 100 and a cap section 104 having a chamber 105 receiving the upwardly extending neck 106 of valve seat member 103, the latter, including neck 106, being provided with an axial passage, as shown more clearly in Figure 6. The body section 100 is provided at its upper end with an outwardly extending circumferential flange upon which seats a similar flange of the cap section 104, the two sections being secured together in a suitable manner, conveniently by means of bolts and nuts as shown. The cap section 104 is provided with a recess receiving an O-seal ring 107 compressed between the opposed flanges of body section 100 and cap section 104 and providing an air tight seal therebetween, as will be understood. The top cap section 104 of suction control valve 62 is provided with a coaxial neck 108 which is connected by a conduit 109 of suitable type, conveniently a flexible rubber tube, to a suitable source of suction such as the manifold 110 of the automobile; as shown more clearly in Figure 10. The conduit 109 includes a T fitting 111 which is connected by conduit 112 to the nipple 94 of the direct suction port 93 of plate 27. The nipple 108 of the air and suction control valve 62 and the direct suction port 93 of the base plate 27 are thus both connected to the source of suction, i.e., the intake manifold 110 of the automobile. The valve seat member 103 receives the upper reduced extension of a needle valve member 113 having at its upper end, adjoining the extension previously referred to, a frusto-conical element 114 adapted to seat in a corresponding recess in the lower end of the seat member 103. The body of valve member 113 is of cylindrical shape and, at its lower portion, extends loosely through a lower valve seat member 115, formed of suitable material, such as rubber, and attached to a diaphragm 116 provided with an upwardly extending circumferential flange 117 of substantial thickness disposed in a recess 118 in the lower end of body section 100. The section 100 is provided at its lower end with an outer circumferential flange 119 which seats on an outer circumferential flange 120 at the upper end of a lower section or barrel 121. The flanges 119 and 120 are secured together by bolt and nut means, as shown, such means also serving to secure the valve 62 to suitably disposed projections or ears 122 of the bracket 63 and to compress flange 117 so as to provide an air tight seal between section 100 and barrel 121. The needle valve member 113 is provided at its lower end with a frusto-conical head 123 which cooperates with the corresponding valve seat formed in the seat member 115. The upper end of member 115 is recessed, as shown in Figure 6, for reception of the lower portion of a compression spring 124 disposed about the needle valve member 113 and confined between member 115 and a snap ring 125 engaging into a groove in the needle valve member 113. The compression spring 124 normally holds the needle valve member 113 in its raised position, with element 114 seated in member 103, head 123 of needle valve member 113 being then spaced from its seat in member 115, as shown in Figure 6. In that connection, the diaphragm 116 possesses appreciable rigidity, while being flexible, sufficient normally to hold the valve seat member 115 in its normal raised position shown. The valve member 115 is provided at its lower end with an outer circumferential flange over which engages a stirrup 126 to which is attached the upper end of a tension spring 127 the lower end of which is attached to an adjusting screw 128. Screw 128 passes through an opening in a bottom plate 129 bolted to the lower flanged end of barrel 121. Opening 130 in plate 129 is aligned with an opening 131 in a channel member 132 bolted to the underface of plate 129. A cam follower 133 of approximately L-shape is pivoted on a pin 134 extending between and mounted in ears 135 projecting from one end of a channel mounting member 132. The follower 133 is provided with an opening 136 and with an opening 137 accommodating the head of one of the bolts 138 securing plate 129 to the base flange of barrel 121 and also securing the channel member 132 in position, it being noted that channel member 132 may also be soldered or brazed to plate 129. The opening 136 is aligned with the openings 130 and 131 all of which are of materially greater diameter than the screw 128. An adjusting nut 139 is threaded on screw 128 and seats on a washer 140 seating on the underface of follower 133. The follower 133 is provided with a finger 141 disposed to contact the edge of the cam member 59, as shown in Figures 4 and 6. Normally, the finger 141 contacts a low point of the cam member 59 and the follower 133 is in its position shown in Figure 6. The needle valve member 113 is then in its raised position cutting off communication between the chambers 102 and 105 with head 123 spaced from its seat. Atmospheric air entering the barrel 121, by way of notch 142 in follower 133 and the openings 131 and 130 passes through the valve member 115 into chamber 102 and thence through nipple 99 and conduit 98 through port 87 into the controlled suction passage 66 of the selector control head 28. The screw 128 and associated nut 139 provide means for adjusting the tension of spring 127 and thereby adjusting the extent of opening to vacuum or suction of the needle valve member 113, as will be explained more fully later.

Referring further to Figure 6, the cam member 59 is provided with a plurality of dwells extending between low points and high points thereof, as will be explained more fully presently. When the finger 141 of cam follower 133 contacts the low point of the cam member 59, as shown, the valve element 123 of needle valve member 113 is unseated and valve element 114 is held seated by spring 124, diaphragm 116 being sufficiently rigid for that purpose, as previously stated. The chamber 102 is then closed to chamber 105 and, accordingly, is also closed to suction, and is opened to barrel 121 and through the latter to atmosphere. Turning of the selector head 28 and cam member 59 clockwise a proper distance from the position thereof shown in Figure 6 brings beneath finger 141 a dwell of cam member 59 rising from the low point toward a high point, as will appear more fully later; that swings the follower 133 clockwise and moves screw 128 downward away from barrel 121, effective for pulling the valve member 115 downward. In the initial downward movement of member 115 valve element 123 of the needle valve member 113 is seated effective for closing chamber 102 to atmosphere. Thereafter, in the continued clockwise turning of cam member 59, follower 133 is swung a further distance downward thereby pulling needle valve member 113 downward and unseating valve element 114, effective for opening chamber 102 to chamber 105 and thereby opening chamber 102 to suction. The nipple 99 opening from chamber 102 is connected by conduit 98 to controlled suction areas of the selector control head 28 adjustable for selectively connecting such areas to suction motors which operate dampers of a ventilating and heating control system, as described more fully later. Accordingly, when the cam member 59 has been turned clockwise to the extent indicated, certain of the damper motors, depending upon the adjustment of control head 28, will be connected to suction and closed to atmosphere. If turning of the cam member 59 is now stopped, the suction in chamber 102 will move diaphragm upward, in opposition to tension spring 127, seating valve element 114, with valve element 123 remaining seated, establishing a state of equilibrium and the parts then remain stabilized. Accordingly, the chamber 102 is then closed to both suction and atmosphere, and suction of a value corresponding to the extent of turning of cam member 59 remains trapped in the damper motors which hold the corresponding dampers in the desired adjustment. Assuming that turning of control head 28 and cam member 59 has opened the dampers beyond the extent desired, by turning head 28 and cam member 59 in the reverse or counterclockwise direction, the follower 133 is permitted to turn counter-clockwise, still referring to Figure 6, thereby reducing the tension of spring 127. The diaphragm is then moved upward by the suction in chamber 102 thereby cracking valve element 123 open so as to bleed air to chamber 102 and thence to the damper motors. As the suction effect in chamber 102 is reduced valve member 115 is moved downward by spring 127, closing valve element 123 when the down pull of spring 127 balances the up pull of diaphragm due to the reduced suction in chamber 102, resulting in a state of equilibrium in which chamber 102 is again closed to both suction and atmosphere and suction of reduced value is trapped in the damper motors as before. The reduction of suction in the damper motors by bleeding air thereto permits closing of the dampers to a corresponding extent, as will be understood. The screw 128 and nut 139 provide means for adjusting the tension of spring 127 to the proper value, as previously stated. Certain of the dwells of the cam member 59 increase from a low point to a high point and then decrease from the high point to a second low point, as explained more fully later. Accordingly, when finger 141 of follower 133 contacts such a dwell, by turning cam member 59 in one direction to proper extent the suction applied to the damper motors may be increased and then decreased, as and for purposes hereinafter described. It will be seen that the air and suction control valve 62 and associated parts provide means whereby the damper motors may be selectively connected to suction and to atmosphere to variable extent as and for the purposes hereinafter described.

As will be understood from what has been said, in the normal position of the selector control head 28 and the cam member 59, the controlled suction passage 66 of head 28 is closed to suction and opened to atmosphere, the direct suction passage 79 of head 28 is connected to a source of suction or intake manifold 110 by means of conduit 112, fitting 111 and a portion of the conduit 109, and the inner and outer portions 73 and 74 of the atmospheric air passage of head 28 are connected to atmosphere through the ports 32. The nipples 94 of the damper ports 88 to 92, inclusive, are respectively connected by a conduit 145, which may be a rubber tube, to a nipple 146, shown more clearly in Figure 8, secured in and opening through an end wall 147 of cylindrical body 148 of a damper motor 149. The motor body 148 is provided at its other end with an outwardly extending circumferential flange 150 on the outer face of which seats an outwardly extending circumferential flange 151 of a flexible bag like diaphragm 152 formed of rubber or other suitable material. The diaphragm 152 extends across head 153 of cup piston 154 disposed within body 148 and spaced therefrom. A clamp disc 155 seats on the outer face of the head of diaphragm 152 and a finger 156 of a flat piston rod 157 seats on the outer face of disc 155 centrally thereof. Head 153 of piston 154, disc 155 and finger 156 are secured tightly together by a rivet 158 with the head of diaphragm 152 clamped between disc 155 and head 153 of piston 154. The piston rod 157 is slidable through a slot 159 in a cupped head 160 having an outwardly extending circumferential flange 161 seating on flange 151 of diaphragm 152 and bent over flange 150 of body 148, effective for tightly clamping flange 151 of diaphragm 152 between flanges 161 and 150. The head 160 is further provided with an opening 162 for venting the motor 149 in the movements of piston 154. A spiral compression spring 163 seats at its smaller end on wall 147 about the inner end of nipple 146 and at its larger end on the head 153 of piston 154, that end of spring 163 preferably being of the same diameter as the inner diameter of piston 154. The compression spring 163 normally holds piston 154 in its position shown in Figure 8, in which the head end portion of the piston extends a short distance into the motor head 160. When the nipple 146 is connected to a source of suction, such as the intake manifold 110, the piston 154 is moved to a retracted position in opposition to the compression spring 163, as will be understood, movement of the piston imparting lengthwise movement to the piston rod 157 in desired direction.

The control means of my invention so far described constitutes a portion of an automobile ventilation and heating control system of known type, shown diagrammatically in Figure 9. Such system comprises a trough like air inlet manifold 166 which, in practice, extends the major portion of the width of the cowl of the automobile and is covered by a suitable grill (not shown). Left and right air ducts 167 and 168, respectively, extend from the manifold 166 and open into the body of the automobile adjacent the left and right sides thereof. A central duct 169 extends from manifold 166 and opens into a smaller duct 170 which delivers air to a blower 171 driven by an electric motor 172 of known type. The blower 171 discharges air into the housing 173 of a heater having a core 174 from which heated air is delivered to casing 173 and thence by duct 175 to the interior of the automobile. The core 174 is spaced from the bottom of casing 173 to provide a by-pass opening 176 through which unheated air may be delivered to duct 175, and a duct 177 leads from duct 175 to slots adjacent the lower portion of the windshield for delivering heated air thereto. The ducts 167, 168, 170 and 177, and the by-pass opening 176, are controlled by dampers 178, 179, 180, 181 and 182, respectively. The heating and ventilating system of Figure 9 so far described is of known type and need not be described in further detail. In the normal condition of the system, when it is not in use for either ventilating or heating purposes, all of the dampers are in closed position, as shown, except the by-pass damper 182 which is in its normal full open position.

Each of the dampers is secured at its midwidth on a damper rod 185 mounted for turning movement in the walls of the associated duct. Referring to Figure 11, damper 178 of the left duct 167, for example, is mounted on rod 185 which is rockably mounted in the opposite walls of duct 167. Rod 185 is provided at one end thereof with a crank 186 the arm of which passes through an opening 187 in piston rod 157 of the corresponding damper motor 149. Normally the pistons of all of the damper motors are in their projected positions shown in Figure 8 effective for holding the corresponding dampers in closed position, except the by-pass damper 182 the crank 186 of which is so disposed that damper 182 is held in its normal open position when the piston of its motor is in projected position. In order to turn damper 178 from its full closed position to its full open position the motor for operating that damper is connected to suction and the piston 154 of that motor is moved to its retracted position in which the damper 178 is turned through 90°, at which time the crank 186 of the damper rod 185 is in dead center position relative to piston 154 thereby restraining the latter against further movement responsive to suction and assuring that the damper is held in full open position, the cranks 186 of the respective dampers being appropriately disposed to that end, as will be understood. Certain of the dampers may be adjusted to intermediate positions between full open and full closed and certain other dampers are not so adjusted, as will be explained more fully later, it being understood that the by-pass damper normally is in full open position, as previously stated, and is moved in closing direction responsive to connection of its motor to the suction source.

As will be understood from what has been said, the switch rod 51 may be turned independently of the selector control head 28 for turning the blower off and on as desired and the speed of the motor may be adjusted from high to low by turning of the knob 49 in proper direction, as indicated in Figure 1.

When the selector control head 28 is in its normal position shown in Figure 12 the dial 48 is in its position shown in Figure 1 with the word "Off" between the arrows 190 and 191 uppermost, indicating that the control means is shut off. Low point 1 of cam 59 then contacts follower finger 141 and the air and suction control valve 62 is then closed to suction and open to atmosphere. Referring further to Figure 12, in the normal position shown of the selector head 28, the wider portion 69 of the controlled suction passage 66 of the selector head 28 overlies the controlled suction port 87, the outer portion of atmospheric air passage 74 overlies the left damper port 88, the right damper port 89 and the by-pass damper port 92, the wider portion of the direct suction passage 79 overlies the direct suction port 93, and the inner wider portion 73 of the atmospheric air passage overlies the blower damper port 90 and the defroster damper port 91. All of the dampers are then closed, except the by-pass damper 182, which normally is open. The finger 141 of the cam follower 133 is then in pressure contact with the cam 59 at a low point 1 thereof, as stated above.

In the winter or cold weather operation of the control means, for heating and defrosting, the selector control head 28 is turned counter-clockwise, as viewed in Figure 12, as indicated by the arrow—the dial 48 being turned clockwise, as viewed in Figure 1. Turning of selector head 28 counter-clockwise from its position shown in Figure 12 for approximately 22° brings point *a* of cam 59 to position in contact with the follower finger 141 without operating the latter. That also positions the wider portion of the direct suction passage 79 in overlying relation to the blower damper port 90 and positions an element of rib 29 in overlying relation to the by-pass damper port 92. The blower damper motor 149 is then connected to direct suction and opens the blower damper 180 to its full extent, the by-pass damper 182 remaining open. The blower 171 then forces air through the heater, assuming that the switch 55 controlling the blower motor 172 has been closed. A portion of the air discharged by the blower 171 passes through the core 174 of the heater and a portion of the air passes around the core 174 and mixes with the heated air discharged from the core, the heated air mixture being discharged into the interior of the automobile. The selector control head 28 is then in its position shown in Figure 13, with the blower damper 180 and the by-pass damper 182 both fully opened and all other of the dampers remaining closed. Turning of head 28 a short distance further brings the inner narrow arm 70 of the controlled suction passage 66 over the by-pass damper port 92 and brings the outer narrow arm 67 of the controlled suction passage 66 over the controlled suction port 87. The cam 59 rises from point *a* to point *b* and in the turning of head 28 a further distance, to its position shown in Figure 14, with point *b* contacting follower finger 141, the air and suction control valve 62 is closed to atmosphere and is gradually opened to suction to its full extent. That connects the motor 149 of the by-pass damper 182 to suction to full extent and closes that damper. All of the air discharged from the blower 171 then passes through the core 174 of the heater, rendering available the maximum heating capacity thereof. By adjusting head 28 at any selected point between points *a* and *b* the heat delivered by the heater may be varied, as will be understood. Head 28 is turned approximately 63° from its position of Figure 13 to its position of Figure 14, that is a total of 85° from its normal position of Figure 12. In the position of head 28 shown in Figure 14 the blower damper remains fully opened and all other of the dampers, including the by-pass damper, are closed. The heater then delivers maximum heat to the interior of the automobile. Turning head 28 in clockwise direction from the position of Figure 14 opens the by-pass damper 182 to a greater or lesser extent, as desired, for varying the heat output of the heater as desired. Further turning of head 28 in counter-clockwise direction from its position shown in Figure 14 through 30° to its position shown in Figure 15 brings high point *c* of the cam 59 into position in contact with the follower finger 141. The direct suction passage 79 of head 28 then overlies the defroster damper port 91 as well as the blower damper port 90 and the direct suction port 93. The by-pass damper 182 then remains closed and the defroster damper 181 is moved to full open position for delivering heated air to the windshield, all of the dampers, except the defroster damper 181 and the blower damper 180, now being closed. The selector head has now been turned through a total of 115° from its normal position shown in Figure 12. Further turning of head 28 counter-clockwise through 53° to its position shown in Figure 16 brings lower point *d* of cam 59 to position in contact with follower finger 141. That causes reduction of the suction in chamber 102 of the air and suction control valve 62 and resultant partial opening of the by-pass damper 182, the port 92 of which is then adjacent the open end of the narrow arm 70 of the controlled suction passage 66 of head 28, the defroster damper 181 and the blower damper 180 then being open due to the fact that the ports 91 and 90 thereof are still under the direct suction passage 79 of head 28. The heat output of the heater is then reduced, a portion of the heated air is discharged directly into the automobile and a portion is discharged against the windshield. The selector head 28 has then been turned counter-clockwise approximately 168° from its normal position of Figure 12. Turning the selector head 28 a further distance through approximately 32°, giving a total of approximately 200°, closes ports 92 and 93, by elements of rib 29, positions the inner portion 73 of the atmospheric air passage over ports 90 and 91, and brings abrupt shoulder 6 of cam 59 in contact with follower finger 141, as shown in Figure 17. The follower finger 141 is then at the second low point of the dwell of cam 59, extending from the first low point shown in Figure 12 to shoulder 6, chamber 102 of the air and suction control valve 62 is open to atmosphere, as in Figure 6, and by-pass damper 182 is then open, all other of the dampers are closed, head 28 is held against further turning counter-clockwise, and the normally lower "Off" legend is then at the upper portion of the dial indicating that the control means is shut off.

By turning the selector head 28 counter-clockwise to an appropriate extent from its position of Figure 12 the blower damper 180 is fully opened, the by-pass damper 182 is closed to desired extent and the defroster damper 181 is opened, with the blower damper 180 remaining open. By turning the selector head 28 clockwise, from a counter-clockwise position, or counter-clockwise to limited extent, the extent of opening or closing of the by-pass damper 182 may readily be varied and the defroster damper 181 may be opened or closed, as desired or as conditions may require. When the selector head 28 is turned clockwise from its position shown in Figure 16 to its normal position shown in Figure 12, the operations above described will be repeated in reverse sequence, as will be understood from what has been said.

In warm weather or summer operation, the selector head 28 is turned clockwise, as viewed in Figure 18, as indicated by the arrow—the dial 59 being turned counter-clockwise as viewed in Figure 1. Turning head 28 clockwise from its position of Figure 12 approximately 8° brings the wider portion 69 of the controlled suction passage 66 of head 28 over the left damper port 88. Further turning of head 28 for approximately 37° brings high point 2 of cam 59 to position contacting the finger 141 of follower 133 and opens the air and suction control valve 62 to suction to full extent causing opening of the left damper 178 to full extent and admission of air to the interior of the automobile through the left air inlet duct 167. The selector head 28 has then been turned clockwise 45° and is in its position shown in Figure 18, in which all other of the ports, except the controlled suction port 87, which at all times underlies controlled suction passage 66, and the direct suction port 93, underlie the atmospheric air passage 66 of head 28, the direct suction port 93 then underlying the direct suction passage 79 of head 28. The left damper 178 is then full open, the by-pass damper 182 is full open, and all other of the dampers are closed. Turning head 28 a further distance of approximately 8° (total 53°), brings a low point 3 of cam 59 beneath the follower finger 141, with chamber 102 of the air and suction control valve 62 closed to suction and opened to atmosphere, as in Figure 6, thereby causing closing of the left damper 178. A further turn of 37° (total 90°) brings the narrow finger 83 of the atmospheric passage 74 of head 28 over the left damper port 88, assuring that the left damper 178 remains closed, brings the wider portion 69 of the controlled suction passage 66 of head 28 over the right damper port 89 and brings a high point 4 of cam 59 into position in contact with the follower finger 141. During turning of head 28 to its position shown in Figure 19, the left damper port 88 remains under finger 83 of the atmospheric passage 74, the right damper port 89 comes under narrow arm 192 of the controlled suction passage 66 and chamber 102 of the air and suction control valve 62 is closed to atmosphere and opened to suction to substantially full extent, causing opening of the right damper 179 to full extent. In the position of head 28 shown in Figure 19, the left damper 178 is closed, the right damper 179 is full open, the by-pass damper 182 is full open, and all other of the dampers are closed. Further turning of head 28 through approximately 8° (total 98°) from point 4 to point 5 of cam 59 brings low point 5 of cam 59 to position in contact with follower finger 141 and also brings neck 84 of the atmospheric passage 66 of head 28 over the right damper port 89, closing the right damper 179, the left damper 178 remaining closed. Turning head 28 a short distance further brings the narrow arm 82 of the direct suction passage 79 of head 28 over the right damper port 89, opening the right damper 179 and also opens the left damper 178 to substantial extent due to the rise of the cam 59 from point 5 to point 6 passing beneath the follower finger 141. When the head 28 has been turned approximately 40° (total 138°) from point 5 of the cam 59 it is in the position shown in Figure 20. The left damper port 88 is now under the wider portion 68 of the controlled suction passage 66 of head 28, the right damper port 89 is closed by an element of rib 29, as are the defroster damper port 91 and the by-pass damper port 92, and the direct suction port 93 underlies the outer end of narrow arm 80 of the direct suction passage 79 of head 28. The left damper 178 is now substantially full open, the right damper 179 is full open, the by-pass damper 182 is full open, and all other of the dampers are closed. Turning of head 28 a further distance of 15° (total 153°) brings it to its position shown in Figure 21, with the blower damper port 90, the by-pass damper port 92 and the direct suction port 93 closed by elements of rib 29, the direct suction passage 79 of head 28 overlying the defroster damper port 91 and the neck 71 of the controlled suction passage 66 of head 28 overlying the right damper port 89. The left and right dampers 178 and 179 are then full open for maximum ventilation, the by-pass damper 182 is in its normal full open position and all other of the dampers are closed. In its position shown in Figure 21 the selector head has been turned clockwise from its normal position shown in Figure 12 through approximately 153°, at which point stop 193 on cam 59 contacts stop 194 on cover 26, effective for preventing turning of head 58 further in clockwise direction. As will be understood from what has been said, by turning head 28 clockwise from its normal position the left and right dampers may be opened and closed successively and the extent of opening thereof may be adjusted to vary the extent of ventilation as desired. In turning of head 28 in counter-clockwise direction, from its position of Figure 21 to its normal position of Figure 12, the operations just described will be repeated in reverse order, as will be understood from what has been said. Obviously, head 28 may be adjusted to any intermediate position, for either winter or summer operation, to produce the effect desired in respect to either heating or ventilating.

The control means of my invention renders possible adjustment, by turning in appropriate direction a single operating member, of the conventional automobile heating and ventilating system for either heating or ventilating and regulation of such system to desired extent; as will be clear from what has been said. Further, in the control means of my invention, the heater blower may be turned on or off, and operated at low speed or high speed, independently of the adjustments of the system by the single operating member; as desired or as conditions may require. It will be understood that changes in detail may be resorted to without departing from the field and scope of my invention and I intend to include all such variations, as fall within the scope of the appended claims, in this application in which the preferred form only of my invention has been disclosed.

I claim:

1. In means for operating the dampers of an automobile heating and ventilating system, a plurality of dampers respectively yieldingly held in one position, suction operated motors respectively connected to said dampers for moving them from said one position, a suction source, control means comprising a member having a plurality of motor ports respectively connected to said motors and an opposed selector control head mounted for relative rotation and provided at its inner face with a plurality of separate passages including a first passage connected to atmosphere, a second passage connected to said suction source and a third passage, and air and suction control means connected to said suction source and to said third passage, said air and suction control means and said head having cooperating means effective for opening said third passage to atmosphere and closing it to suction in one position of said head and closing said third passage to atmosphere and opening it to suction to variable extent responsive to turning of said head from its said one position, said first passage overlying said motor ports and connecting all of said motors to atmosphere in said one position of said head, said passages being positionable over said motor ports selectively by turning of said head from its said one position effective for selectively connecting said motors to said third passage and to atmosphere.

2. In means for operating the dampers of an automobile heating and ventilating system, a plurality of dampers respectively yieldingly held in one position, suction operated motors respectively connected to said dampers for moving them from said one position, a suction source, control means comprising a member having a plurality of motor ports respectively connected to said motors and an opposed selector control head mounted for relative rotation and provided at its inner face with a plurality of separate passages including a first passage connected to atmosphere, a second passage connected to said suction source and a third passage, and air and suction control means connected to said suction source and to said third passage said air and suction control means and said head having cooperating means effective for opening said third passage to atmosphere and closing it to suction in one position of said head and closing said third passage to atmosphere and opening it to suction to variable extent responsive to turning of said head from its said one position, said first passage overlying said motor ports and connecting all of said motors to atmosphere in said one position of said head, said passages being positionable over said motor ports selectively by turning of said head from its said one position effective for selectively and simultaneously connecting certain of said motors to said first passage and certain other of said motors to said third passage.

3. In means for operating the dampers of an automobile heating and ventilating system, a plurality of dampers respectively yieldingly held in one position, suction operated motors respectively connected to said dampers for moving them from said one position, a suction source, control means comprising a member having a plurality of motor ports respectively connected to said motors and an opposed selector control head mounted for relative rotation and provided at its inner face with a plurality of separate passages including a first passage connected to atmosphere, a second passage connected to said suction source and a third passage having a controlled suction port, and air and suction control means connected to said suction source and to said suction port, said air and suction control means and said head having cooperating means effective for opening said controlled suction port to atmosphere and closing it to suction in one position of said head and closing said suction port to atmosphere and opening it to suction to variable extent responsive to turning of said head from its said one position, said first passage overlying said motor ports and connecting all of said motors to atmosphere in said one position of said head, said passages being positionable over said motor ports selectively by turning of said head from its said one position effective for selectively connecting said motors to said third passage and to atmosphere.

4. In means for operating the dampers of an automobile heating and ventilating system, a plurality of dampers respectively yieldingly held in one position, suction operated motors respectively connected to said dampers for moving them from said one position, a suction source, control means comprising a member having a plurality of motor ports respectively connected to said motors and an opposed selector control head mounted for relative rotation and provided at its inner face with a plurality of separate passages including a first passage connected to atmosphere, a second passage connected to said suction source and a third passage, and air and suction control means connected to said suction source and to said third passage, said air and suction control means and said head having cooperating means effective for opening said third passage to atmosphere and closing it to suction in one position of said head and closing said third passage to atmosphere and opening it to suction to variable extent responsive to turning of said head from its said one position, said first passage overlying said motor ports and connecting all of said motors to atmosphere in said one position of said head, said passages being positionable over said motor ports selectively by turning of said head from its said one position effective for connecting certain of said motors to said third passage and other of said motors to said first passage responsive to turning of said head in one direction from said one position and connecting other of said motors to said third passage and said certain motors to said first passage responsive to turning of said head in the opposite direction from said one position.

5. In means for operating the dampers of an automobile heating and ventilating system, a plurality of dampers respectively yieldingly held in one position, suction operated motors respectively connected to said dampers for moving them from said one position, a suction source, control means comprising a member having a plurality of motor ports respectively connected to said motors and an opposed selector control head mounted for relative rotation and provided at its inner face with a plurality of separate passages including a first passage connected to atmosphere, a second passage connected to said suction source and a third passage, and an air and suction control valve connected to said suction source and to said third passage, said valve and said head having cooperating means effective for opening said third passage to atmosphere and closing it to suction in one position of said head and closing said third passage to atmosphere and opening it to suction to variable extent responsive to turning of said head from its said one position, said first passage overlying said motor ports and connecting all of said motors to atmosphere in said one position of said head, said passages being positionable over said motor ports selectively by turning of said head from its said one position effective for selectively connecting said motors to said third passage and to atmosphere.

6. In means for operating the dampers of an automobile heating and ventilating system; a plurality of dampers respectively yieldingly held in one position; suction operated motors respectively connected to said dampers for moving them from said one position; a suction source; control means comprising two opposed members defining between them separate controlled suction, direct suction and atmospheric air passages, and having a controlled suction port opening into said controlled suction passage, a direct suction port connected to said suction source and opening into said direct suction passage, a port connected to atmosphere and opening into said atmospheric air passage and a plurality of motor ports opening through one of said members and respectively connected to said motors; one of said members being adjustable relative to the other thereof and having one position effective for connecting all of said motor ports to said atmospheric air passage and in its movement from said one position being effective for selectively connecting certain of said motor ports to said suction passages with certain other of said motor ports connected to said atmospheric air passage; and air and suction control means connected to said suction source and to said controlled suction port, said air and suction control means and said one member have cooperating means effective for opening said controlled suction port to atmosphere and closing it to suction when said one member is in its said one position and closing said control suction port to atmosphere and opening it to suction to variable extent responsive to movement of said one member from its said one position.

7. In means for operating the dampers of an automobile heating and ventilating system; a plurality of dampers respectively yieldingly held in one position; suction operated motors respectively connected to said dampers for moving them from said one position; a suction source; control means comprising two opposed members defining between them separate controlled suction, direct suction and atmospheric air passages, and having a controlled suction port opening into said controlled suction passage, a direct suction port connected to said suction source and opening into said direct suction passage, a port connected to atmosphere and opening into said atmospheric air passage and a plurality of motor ports respectively connected to said motors; one of said control members being adjustable in opposite directions relative to the other control member and having one position effective for connecting all of said motor ports to said atmospheric air passage, said one member in its movement in one direction from said one position being effective for selectively connecting certain of said motor ports to said suction passages with other of said motor ports connected to said atmospheric air passage and in its movement from said one position in the opposite direction being effective for selectively connecting said certain motor ports to said atmospheric air passage with said other of said motor ports connected to said suction passages; and air and suction control means connected to said suction source and to said controlled suction port, said air and suction control means and said one movable member having cooperating means effective for opening said controlled suction port to atmosphere and closing it to suction when said one member is in its said one position and closing said controlled suction port to atmosphere and opening it to suction to variable extent responsive to movement of said one member from its said one position.

8. In means for operating the dampers of an automobile heating and ventilating system; a plurality of dampers respectively yieldingly held in one position; suction operated motors respectively connected to said dampers for moving them from said one position; a suction source; control means comprising two opposed members defining between them separate controlled suction, direct suction and atmospheric air passages, and having a controlled suction port opening into said controlled suction passage, a direct suction port connected to said suction source and opening into said direct suction passage, a port connected to atmosphere and opening into said atmospheric air passage and a plurality of motor ports respectively connected to said motors; one of said control members being adjustable relative to the other control member and having one position effective for connecting all of said motor ports to said atmospheric air passage and in its movement from said one position being effective for selectively connecting certain of said motor ports to said suction passages with certain other of said motor ports connected to said atmospheric air passage; and an air and suction control valve connected to said suction source and to said controlled suction port, said valve and said one control member having cooperating means effective for holding said valve open to atmosphere when said one member is in its one position and for varying the effective suction in said valve and controlled suction passage responsive to movement of said one member from its said one position.

9. In means for operating the dampers of an automobile heating and ventilating system; a plurality of dampers respectively yieldingly held in one position; suction motors respectively connected to said dampers for moving them from said one position; a suction source; a fixed base plate having ports respectively connected to said motors, a direct suction port directly connected to said source of suction, and a controlled suction port; a selector control head seating on said plate in sealing contact therewith and having at its inner side means providing an atmospheric air passage connected to atmosphere, a direct suction passage open to said direct suction port, and a controlled suction passage open to said controlled suction port, said passages being closed to each other; and an air and suction control valve connected to said suction source and to said controlled suction port; said head having one position effective for connecting all of said motor ports to said atmospheric air passage and being turnable in opposite directions from said one position and when turned from said one position being effective for selectively connecting said motor ports to said suction passages and said atmospheric air passage; said head and valve having cooperating means effective for holding said valve open to atmosphere when said head is in its said one position and for varying the effective suction in said valve and controlled suction passage responsive to turning of said head.

10. In means for operating the dampers of an automobile heating and ventilating system; a plurality of dampers respectively yieldingly held in one position; suction motors respectively connected to said dampers for moving them from said one position; a suction source; a fixed base plate having ports respectively connected to said motors, a direct suction port directly connected to said source of suction, and a controlled suction port; a selector control head defining with said plate separate controlled suction, atmospheric air and direct suction passages open to said controlled suction port, atmosphere and direct suction port, respectively; an air and suction control valve connected to said controlled suction port and to said suction source and yieldingly closed to atmosphere; said head having one position with said atmospheric air passage overlying all of said motor ports and being turnable from said one position and relative to said base plate and effective when turned for selectively disposing said passages over said motor ports; said valve and head having cooperating means effective for opening said valve to atmosphere in said one position of said head and for releasing said valve for closing thereof to atmosphere and varying the effective suction in said valve and controlled suction passage responsive to turning of said head from said one position.

11. In means for operating the dampers of an automobile heating and ventilating system; a plurality of dampers respectively yieldingly held in one position; suction motors respectively connected to said dampers for moving them from said one position; a suction source; a fixed base plate having ports respectively connected to said motors, a direct suction port directly connected to said source of suction, and a controlled suction port; a rotatably mounted selector control head having a rim and a rib seating on said plate in sealing contact therewith providing an atmospheric air passage connected to atmosphere, a direct suction passage overlying said direct suction port, and a controlled suction passage overlying said controlled suction port, said passages being separate from each other; an air and suction control valve connected to said suction source and to said controlled suction port; said head having one position effective for connecting all of said motor ports to said atmospheric air passage and being effective when turned from said one position for selectively positioning said passages over said motor ports; a cam member turnable with said head; and a cam follower actuated by said cam member and having operating connection to said valve effective for opening said valve to atmosphere in said one position of said head and for closing said valve to atmosphere and varying the effective suction in said valve and controlled suction passage responsive to turning of said head from its said one position.

References Cited in the file of this patent

UNITED STATES PATENTS

| 2,109,070 | MacKenzie | Feb. 22, 1938 |
| 2,400,044 | Hermanson | May 7, 1946 |
| 2,634,670 | Simons | Apr. 14, 1953 |
| 2,808,993 | Simons | Oct. 8, 1957 |
| 2,837,288 | Owen | June 3, 1958 |